UNITED STATES PATENT OFFICE.

EARL P. STEVENSON, OF CAMBRIDGE, MASSACHUSETTS, ASSIGNOR, BY MESNE ASSIGNMENTS, TO GENERAL BOND AND SHARE COMPANY, OF BOSTON, MASSACHUSETTS, A CORPORATION OF DELAWARE.

PROCESS OF RECOVERING VALUABLE CONSTITUENTS FROM ALKALINE BRINES AND DEPOSITS.

1,415,206.   Specification of Letters Patent.   Patented May 9, 1922.

No Drawing.   Application filed October 8, 1919.  Serial No. 329,381.

*To all whom it may concern:*

Be it known that I, EARL P. STEVENSON, a citizen of the United States, residing at Cambridge, in the county of Middlesex and State of Massachusetts, have invented certain Improvements in Processes of Recovering Valuable Constituents from Alkaline Brines and Deposits, of which the following description is a specification.

This invention relates to the recovery of sodium carbonate, or soda ash from natural alkaline brines and deposits in the western part of this country, an important example of which brines and deposits is found in Searles Lake, California.

The brine from this lake contains the elements of sodium carbonate, sodium chloride, potassium chloride, sodium sulphate and borax, together with other elements in such small quantities that they can be disregarded so far as the present invention is concerned.

Attempts have been made heretofore to recover soda ash from this and similar brines, and the process usually practised has consisted essentially in passing carbon dioxide into the brine to react with the elements of sodium carbonate to form sodium bicarbonate. The greater part of sodium bicarbonate so formed precipitates and this precipitate is calcined to convert it into sodium carbonate or soda ash and carbon dioxide. The reaction is as follows:

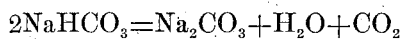

$$2NaHCO_3 = Na_2CO_3 + H_2O + CO_2$$

While the calcining of the sodium bicarbonate results theoretically in a recovery of all the carbon dioxide utilized in the precipitation of the bicarbonate, there is bound to be a certain loss of carbon dioxide in each cycle, which must be supplied from fresh sources. One difficulty encountered in this process has been to find a suitable source of carbon dioxide in the locality where the process must be practised, in order that the unrecovered carbon dioxide from each cycle may be easily replaced. Another difficulty is incident to a purpose of the carbon dioxide treatment other than the recovery of sodium carbonate, namely, the removal of the carbonate from the brine in order to facilitate the recovery of other more valuable constituents, as for example, in the case of Searles Lake brine, borax and potassium chloride.

The removal of the carbonate with carbon dioxide to the point where the brine will be in proper condition for the subsequent removal of the other more valuable constituents, is hardly feasible on a large scale, owing to the decreasing rate of the reaction between the sodium carbonate and carbon dioxide as the reaction nears completion. This difficulty can only be avoided by working with the carbon dioxide under high pressure with apparent complications in apparatus.

Soda ash itself is not sufficiently valuable to warrant its recovery alone and the recovery of this substance usually is an incident to the recovery of more valuable constituents from the brine. It is the chief object of the present invention to devise a process for recovering soda ash from the brines and deposits of the character above indicated which will overcome the difficulties above mentioned and will be sufficiently economical to make the recovery of soda ash incidental to the recovery of other constituents of such brines and deposits practical on a commercial scale. It is also an object of this invention to devise a process of this character which will facilitate the recovery of other elements or constituents from the brine, particularly in the case of Searles Lake brine, borax and potash.

According to the present process the brine is first treated with carbon dioxide to combine with the elements of the sodium carbonate and form sodium bicarbonate, as in the processes heretofore proposed. I have found that the reaction between the sodium carbonate in the brine and the carbon dioxide proceeds very rapidly at first but that the process slows up as the concentration of the sodium carbonate in the brine decreases, this decrease in the rate of the reaction becoming very marked when approximately 60% of the carbonate has been eliminated from the brine. Accordingly, the carbon dioxide treatment is stopped at about this point and the sodium bicarbonate precipitated during this treatment is filtered off and is then calcined to convert it into soda ash and carbon dioxide. The carbon dioxide produced in this calcining treatment is saved for use in treating additional brine.

The filtrate still contains a substantial percentage of sodium carbonate and practically all of this carbonate next is eliminated from the brine by treating the brine with calcium sulphate, preferably in the form of gypsum. Any suitable apparatus may be used in forming this step of the process such, for instance, as towers packed with gypsum through which the filtrate is run, or the gypsum treatment may be carried on in suitable beds or vats.

The reaction which takes place during this treatment is as follows:

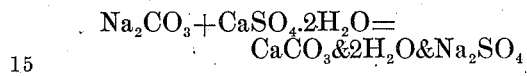
$$Na_2CO_3 + CaSO_4 \cdot 2H_2O = CaCO_3 \& 2H_2O \& Na_2SO_4$$

The calcium carbonate thus formed precipitates while the sodium sulphate is held in solution. Consequently, the calcium carbonate can be filtered off and so much of this calcium carbonate as is necessary may then be calcined to produce a quantity of carbon dioxide which, when added to that obtained by the calcining of the sodium bicarbonate will produce the necessary quantity for repeating the process on a fresh supply of brine. The reaction that takes place in calcining the calcium carbonate is as follows:

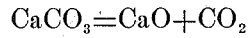
$$CaCO_3 = CaO + CO_2$$

The commercial lime (CaO) produced in this calcining operation may or may not be a valuable commercial product, depending upon market conditions. It may also be pointed out here that the calcium carbonate formed by the gypsum treatment is the precipitated chalk of commerce and this material also may form, under proper market conditions, a valuable product. It will be understood, however, that as the process is repeated only enough of the calcium carbonate will be calcined to supply the carbon dioxide lost in each cycle, and the surplus calcium carbonate may be marketed.

It will now be understood that this process overcomes the difficulties above mentioned which have been experienced with the processes heretofore proposed, since the gypsum treatment effectually accomplishes the removal of the sodium carbonate from solutions of low concentration, and at the same time produces a material, calcium carbonate, which is a convenient source of carbon dioxide to replace that carbon dioxide unavoidably lost in each cycle of operations. It is obvious that since sodium bicarbonate is a marketable product, it may be advisable under some conditions to sell this material and to obtain from some other source the carbon dioxide required to replace that lost in each cycle of operations.

Furthermore, the fact that the carbon dioxide treatment is continued only over that range of concentration of sodium carbonate in the brine in which the reaction proceeds most efficiently, avoids many of the technical difficulties heretofore experienced in recovering soda ash.

This process has very marked advantages in connection with certain processes for recovering borax and potash disclosed, respectively, in my pending applications Serial No. 315,877 and Serial No. 315,875.

According to these processes the brine is chilled to precipitate a substantial percentage of the borax and other salts contained therein except the potassium chloride. The chilled out salts are then treated to recover the borax according to any one of the variations of my process disclosed in application Serial No. 315,877.

For the purpose of recovering the potassium chloride the brine remaining after the chilled out salts have been filtered off is, according to the method disclosed in my application Serial No. 315,875, treated with a suitable precipitant, preferably calcium chloride, to substantially complete the removal of the salts therefrom other than the potassium chloride and sodium chloride. This mixture of salts is then treated to extract the potassium chloride. When the process provided by the present invention is practiced in connection with these processes for recovering borax and potassium chloride, the carbon dioxide and gypsum treatment above described precede the chilling operation, and I find that this procedure produces two advantages; first, it results in a more efficient separation of borax on chilling the brine, and, second, the removal of the sodium carbonate from the brine prior to chilling results in marked economy in the calcium chloride required for subsequently removing the waste salts from the brine preparatory to evaporating this brine for the purpose of extracting the potassium chloride.

While this process has been specifically described herein as applied to the recovery of soda ash from Searles Lake brine, it will readily be appreciated by those skilled in this art that the process is applicable to a great variety of naturally occurring brines in which the elements of sodium carbonate are found and to brines made from salt deposits as well as natural brines. Consequently, it will be understood that the term "Searles Lake brine" as used in some of the appended claims identifies the type of brine to which the present method is applicable rather than brine necessarily taken from Searles Lake.

What is claimed as new is:

1. The process of recovering valuable constituents from alkaline brines containing the elements of sodium carbonate which consists in treating the brine with carbon dioxide to convert a substantial percentage of the sodium carbonate in the brine into sodium bicarbonate, filtering off the sodium bicarbonate precipitate, treating the sodium bicarbonate so obtained to produce sodium carbonate and carbon dioxide, and treating the filtrate with a material that reacts with the constituents of the filtrate to form a substance from which an additional supply of carbon dioxide can be obtained for use in treating a fresh quantity of brine.

2. The process of recovering valuable constituents from alkaline brines containing the elements of sodium carbonate which consists in treating the brine with carbon dioxide to convert a substantial percentage of the sodium carbonate in the brine into sodium bicarbonate, filtering off the sodium bicarbonate precipitate, treating the sodium bicarbonate so obtained to produce sodium carbonate, treating the filtrate with a calcium salt which reacts with the sodium carbonate remaining in the filtrate to form calcium carbonate, and separating the calcium carbonate so formed from said filtrate.

3. The process of recovering valuable constituents from alkaline brines containing the elements of sodium carbonate which consists in treating the brine with carbon dioxide to convert a substantial percentage of the sodium carbonate in the brine into sodium bicarbonate, filtering off the sodium bicarbonate precipitate, treating the sodium bicarbonate so obtained to produce sodium carbonate, treating the filtrate with a calcuim salt which reacts with the sodium carbonate remaining in the filtrate to form calcium carbonate, and calcining the calcium carbonate so formed.

4. The process of recovering sodium carbonate from alkaline brines containing the elements of sodium carbonate, which consists in treating the brine with carbon dioxide to convert a substantial percentage of the sodium carbonate in the brine into sodium bicarbonate, filtering off the sodium bicarbonate precipitate, treating the sodium bicarbonate so obtained to produce sodium carbonate and carbon dioxide, treating the filtrate with calcium sulphate to convert the sodium carbonate remaining in the filtrate into calcium carbonate, treating the calcium carbonate so formed to obtain additional carbon dioxide, and using the carbon dioxide produced by the treatments above described to treat additional brine.

5. The process of recovering valuable constituents from alkaline brines containing the elements of sodium carbonate which consists in treating the brine with carbon dioxide to convert a substantial percentage of the sodium carbonate in the brine into sodium bicarbonate, filtering off the sodium bicarbonate precipitate, treating the filtrate with a material that reacts with constituents of the filtrate to form a substance from which a supply of carbon dioxide can be obtained for use in treating a fresh quantity of brine.

6. The process of recovering sodium carbonate from alkaline brines containing the elements of sodium carbonate, which consists in treating the brine with carbon dioxide to convert sodium carbonate in the brine into sodium bicarbonate, continuing this treatment until the reaction begins to go too slowly to be efficient, filtering off the sodium bicarbonate, calcining the sodium bicarbonate so obtained to produce sodium carbonate and carbon dioxide, treating the filtrate with gypsum to convert sodium carbonate remaining therein into calcium carbonate, calcining the calcium carbonate to produce lime and carbon dioxide, and repeating the process with fresh quantities of brine while using the carbon dioxide obtained in the calcining operations to convert the sodium carbonate of the brine into sodium bicarbonate.

7. In a process of recovering valuable constituents from Searles Lake brine which comprises chilling the brine to separate a substantial percentage of the constituents to be recovered from certain others in the brine, the steps prior to said chilling, of treating the brine with carbon dioxide to convert a substantial percentage of the sodium carbonate in the brine into sodium bicarbonate, filtering off the sodium bicarbonate precipitate, and treating the filtrate with calcium sulphate to substantially eliminate the sodium bicarbonate therefrom, whereby the subsequent recovery of said constituents is facilitated.

8. In a process of recovering valuable constituents including potassium chloride from Searles Lake brine, which comprises treating the brine with calcium chloride to precipitate certain of the waste salts therein, the steps prior to said treatment with calcium chloride, of treating the brine with carbon dioxide to convert a substantial percentage of the sodium carbonate in the brine into sodium bicarbonate, filtering off the sodium bicarbonate precipitate, and treating the filtrate with calcium sulphate to substantially eliminate the sodium bicarbonate therefrom, whereby the subsequent recovery of said constituents is facilitated.

In testimony whereof I have signed my name to this specification.

EARL P. STEVENSON.